United States Patent
Perley et al.

(10) Patent No.: US 10,215,157 B2
(45) Date of Patent: Feb. 26, 2019

(54) METHODS FOR CONTROLLING WIND TURBINE WITH THRUST CONTROL TWIST COMPENSATION

(71) Applicant: General Electric Company, Schenectady, NY (US)

(72) Inventors: Thomas Franklin Perley, Simpsonville, SC (US); Thomas Frank Fric, Greer, SC (US); Arne Koerber, Berlin (DE)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 15/397,896

(22) Filed: Jan. 4, 2017

(65) Prior Publication Data
US 2018/0187647 A1 Jul. 5, 2018

(51) Int. Cl.
*F03D 7/02* (2006.01)
*F03D 7/04* (2006.01)
(Continued)

(52) U.S. Cl.
CPC ........ *F03D 7/0224* (2013.01); *F03D 7/043* (2013.01); *F03D 17/00* (2016.05); *G05B 15/02* (2013.01);
(Continued)

(58) Field of Classification Search
CPC ........ F03D 7/0224; F03D 17/00; F03D 7/043; G05B 15/02; F05B 2270/333;
(Continued)

(56) References Cited

U.S. PATENT DOCUMENTS 5,320,491 A * 6/1994 Coleman ............... F03D 7/0252
244/213
7,281,482 B1 * 10/2007 Beauchamp ........... B63H 25/04
114/151
(Continued)

FOREIGN PATENT DOCUMENTS

EP 2 848 805 A1 3/2015
EP 2 860 394 A2 4/2015

OTHER PUBLICATIONS

Extended European Search Report and Opinion issued in connection with corresponding EP Application No. 172010178.4 dated May 25, 2018.

*Primary Examiner* — Ramesh B Patel
(74) *Attorney, Agent, or Firm* — Dority & Manning, P.A.

(57) ABSTRACT

A method is provided for operation of a wind turbine having rotor blades attached to a hub, wherein a controller compensates for torsionally induced blade twist. The method includes operating the wind turbine according to a rated power output curve and maximum design thrust value, and periodically or continuously detecting for induced torsional twist in the rotor blades. Upon determination of torsional twist being induced in the rotor blades, the method includes adjusting the maximum thrust value in the control program to compensate for the induced twist. The wind turbine controller then controls pitch of the rotor blades as a function of the increased maximum thrust value so that power output of the wind turbine is not unnecessarily limited or increased by the induced twist on the rotor blades.

14 Claims, 4 Drawing Sheets

(51) Int. Cl.
  *F03D 17/00* (2016.01)
  *G05B 15/02* (2006.01)
(52) U.S. Cl.
  CPC .......... *F05B 2270/1031* (2013.01); *F05B 2270/1033* (2013.01); *F05B 2270/32* (2013.01); *F05B 2270/328* (2013.01); *F05B 2270/331* (2013.01); *F05B 2270/333* (2013.01); *F05B 2270/336* (2013.01); *F05B 2270/701* (2013.01); *F05B 2270/8041* (2013.01); *F05B 2270/8042* (2013.01)
(58) Field of Classification Search
  CPC ........ F05B 2270/328; F05B 2270/1031; F05B 2270/701; F05B 2270/8042; F05B 2270/8041; F05B 2270/1033; F05B 2270/32; F05B 2270/336
  See application file for complete search history.

(56) References Cited

U.S. PATENT DOCUMENTS

| | | | | |
|---|---|---|---|---|
| 7,708,530 B2* | 5/2010 | Wobben | ............... | F03D 1/0641 415/4.5 |
| 7,919,880 B2* | 4/2011 | Nielsen | ............... | F03D 7/0212 290/44 |
| 8,366,389 B2* | 2/2013 | Hoffmann | ............ | F03D 7/0224 416/1 |
| 8,662,843 B2* | 3/2014 | Brunken, Jr. | ......... | B64C 27/473 416/23 |
| 8,803,352 B1 | 8/2014 | Koerber et al. | | |
| 8,899,922 B2* | 12/2014 | Fuglsang | ............... | F03D 1/0641 416/1 |
| 2010/0014969 A1* | 1/2010 | Wilson | ............... | F03D 7/0224 416/1 |
| 2011/0285129 A1 | 11/2011 | Li et al. | | |
| 2012/0065942 A1* | 3/2012 | Hwang | .................... | B63H 1/14 703/1 |
| 2012/0229792 A1* | 9/2012 | Fuglsang | ............... | F03D 7/0224 356/28 |
| 2013/0161955 A1 | 6/2013 | Dalsgaard et al. | | |
| 2013/0243590 A1* | 9/2013 | Edenfeld | ............... | F03D 7/0224 416/1 |
| 2014/0030090 A1* | 1/2014 | Kammer | ................. | F03D 17/00 416/1 |
| 2014/0301842 A1 | 10/2014 | Koerber et al. | | |
| 2015/0056072 A1 | 2/2015 | Perley et al. | | |
| 2015/0292483 A1* | 10/2015 | Slack | ................... | F03D 7/0276 290/44 |

\* cited by examiner

METHODS FOR CONTROLLING WIND TURBINE WITH THRUST CONTROL TWIST COMPENSATION

FIELD OF THE INVENTION

The present disclosure relates generally to wind turbines, and more particularly to methods for loading and thrust control of the wind turbine with compensation for blade twisting.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. In particular, the rotor blades experience significant loading, and frequent changes in loading, during operation due to interaction with the wind. Changes in wind speed and direction, for example, may modify the loads experienced by the rotor blades. To reduce rotor blade loading, various methods and apparatus have been developed to enable pitching of the rotor blades during operation. Pitching generally allows the rotor blades to shed a portion of the loads experienced thereby.

The amount of power produced by a wind turbine is typically constrained by structural limitations of the individual wind turbine components. The power available from the wind is proportional to the area of the rotor, and the square of the rotor diameter. Thus, the amount of power produced at different wind speeds can be significantly higher by increasing the diameter of the rotor of the wind turbine. Such an increase in rotor size, however, also increases mechanical loads and material costs in a way that may exceed the corresponding increase in energy production. Further, though it is helpful to control power and rotor speed, thrust from the wind on the rotor truly drives many dominant fatigue loads, along with any asymmetry of that thrust. The thrust force comes from a change in pressure as the wind passes the wind turbine and slows down. The terms "thrust," "thrust value," "thrust parameter" or similar terms are generally used in the art to encompass a force acting on the wind turbine due to the wind and in the general direction of the wind, and may also be used to describe inputs to a control method of a value that changes in direct proportion to thrust in an operating region of interest (e.g. individual or average out-of-plane blade or flap-wise bending, tower bending, or tower top acceleration).

Recent developments in the wind power industry have led to new methods of mechanical-load-reducing controls that allow larger rotor diameters to be employed with less than proportional increases in material costs. For example, some modern wind turbines may implement drive train and tower dampers to reduce loads. In addition, modern wind turbines may utilize individual and collective blade pitch control mechanisms to reduce fatigue and extreme loads, thereby enabling higher ratios between rotor diameter and structural loads while also lowering the cost of energy.

Conventional wind turbines are designed for a rated wind speed at which maximum thrust and maximum power generation occur. At rated wind speed, the turbine controller attempts to limit estimated thrust to a control threshold value (e.g., a value of 350 kN at rated wind speed). At wind speeds higher than rated wind speed, the rotor blades are pitched to reduce thrust. Many methods are known for determining whether to pitch the rotor blades in order to reduce thrust. However, such thrust control should not unnecessarily limit power output of the wind turbine.

Accordingly, improved methods are desired for controlling wind turbine loading as a function of thrust control without prematurely or unnecessarily limiting power output.

BRIEF DESCRIPTION OF THE INVENTION

Aspects and advantages of the invention will be set forth in part in the following description, or may be obvious from the description, or may be learned through practice of the invention.

An aspect of the present invention is the realization by the present inventors that conventional thrust control methodologies actually overestimate thrust in an operational wind turbine and, thus, control thrust (via blade pitching) to an artificially low threshold or maximum value, thereby unnecessarily limiting power output. The current methodologies do not account for the fact that the larger wind turbine blades torsionally deform (twist) at higher wind speeds. This induced twist may be in a "feather" direction wherein the blades dump wind and have reduced loads, or in a "power" direction wherein the blades produce more power and have increased loads. The current inventors have found that with certain wind turbines wherein thrust is controlled so as not to exceed a design threshold value (e.g., a value of 350 kN), upon measurement, actual thrust from the torsionally compliant blades twisted towards the feather direction is significantly less (for example, about 300 kN) than the design control threshold limit. The predefined aerodynamic maps (e.g., look-up tables) that the controller uses to correlate wind speed to thrust do not account for this phenomenon. The wind turbine is thus being held to an artificially low thrust control value, resulting in reduced power output.

On the other hand, when the blades are torsionally twisted to the power direction, blade loads may exceed the design threshold value (for example, if the controller does not use actual blade load as a controlling variable).

Thus, in one embodiment, the present invention is directed to a method for operation of a wind turbine having rotor blades attached to a hub, wherein a controller compensates for torsionally induced blade twist. The method includes operating the wind turbine according to a rated power output curve and a programmed maximum thrust value, and periodically detecting for induced torsional twist in the rotor blades. Upon determination of torsional twist being induced in the rotor blades, the method includes adjusting the programmed maximum thrust value in the controller to compensate for the induced blade twist and controlling pitch of the rotor blades as a function of the adjusted maximum thrust value so that power output of the wind turbine is not unnecessarily limited by the induced twist on the rotor blades.

In a certain embodiment, the programmed maximum thrust value is adjusted proportionally with the amount of torsional twist induced in the rotor blades. In an alternate embodiment, the programmed maximum thrust value is increased by a predefined amount upon the determination of torsional twist in the rotor blades, wherein this set amount is maintained up to cutout wind speed of the rated power output curve.

In some embodiments, the induced torsional twist is directly detected by sensing a change in a physical aspect of the rotor blades resulting from the induced torsional twist. For example, the induced torsional twist may be directly detected by a sensor mounted on the rotor blades, such as a strain gauge, a fiber optic sensor that runs span-wise along the blade, a gyroscopic sensor or accelerometer, a micro inertial measurement unit (MIMU), and so forth.

In another embodiment, the induced torsional twist may be directly optically detected by a camera disposed to view a span-wise aspect of the rotor blade.

In still another embodiment, the induced torsional twist may be directly detected by a laser disposed to detect rotor blade distortion.

In certain embodiments, the induced torsional twist is indirectly detected or inferred. For example, such twist may be indirectly detected by an actual measured blade load being less than an expected value at a given wind speed. Similarly, the twist may be inferred from a measured rotor thrust being less than an expected value at a defined wind speed, for example the wind speed at the knee of the power output curve.

In still other embodiments, the induced torsional twist may be indirectly detected by a measured tower bending being less than an expected value at a defined wind speed, for example the wind speed at the knee of the power output curve.

An embodiment may include inferring the induced torsional twist from a measured noise at a defined wind speed being higher or lower than an expected value.

In yet another embodiment, the induced torsional twist is indirectly detected by a difference at rated wind speed between a measured blade pitch angle and an expected blade pitch angle.

The induced torsional twist may be indirectly detected by a difference between a Model Based Controller (MBC) estimated wind speed and an actual measured wind speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
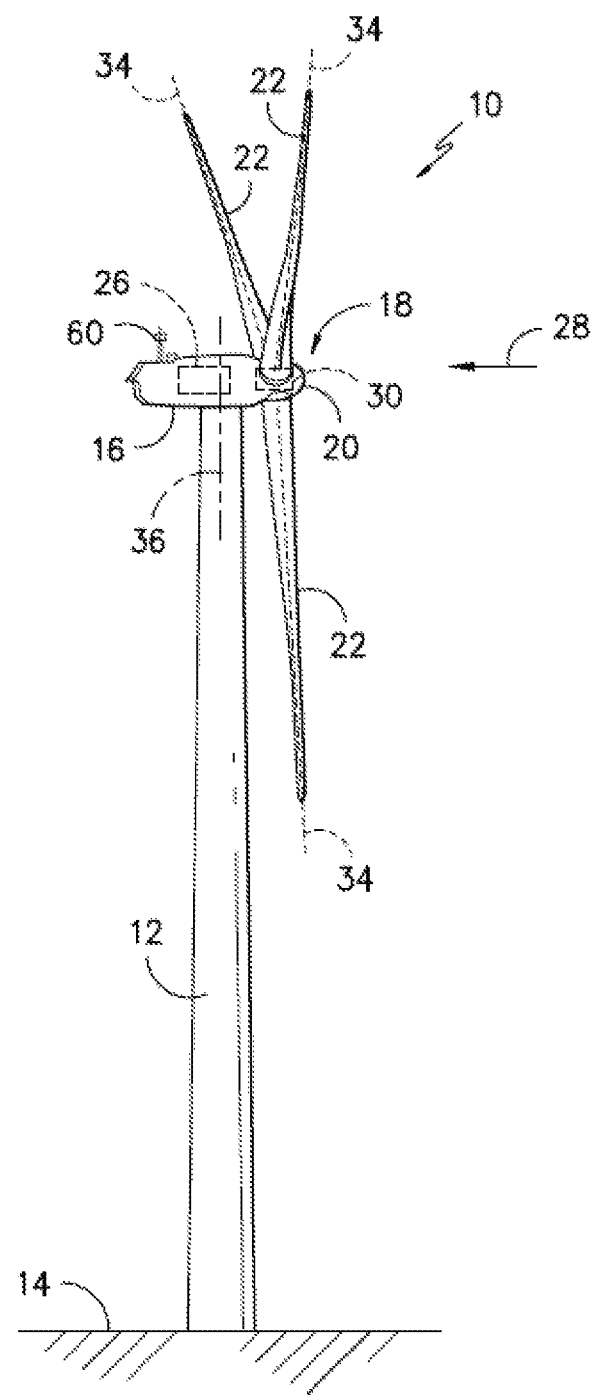
FIG. 1 is a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

It should be appreciated that the turbine controller 26 may generally comprise a computer or any other suitable processing unit. Thus, the turbine controller 26 may include one or more processor(s) and associated memory device(s) configured to perform a variety of computer-implemented functions, as discussed below. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Figure 2:
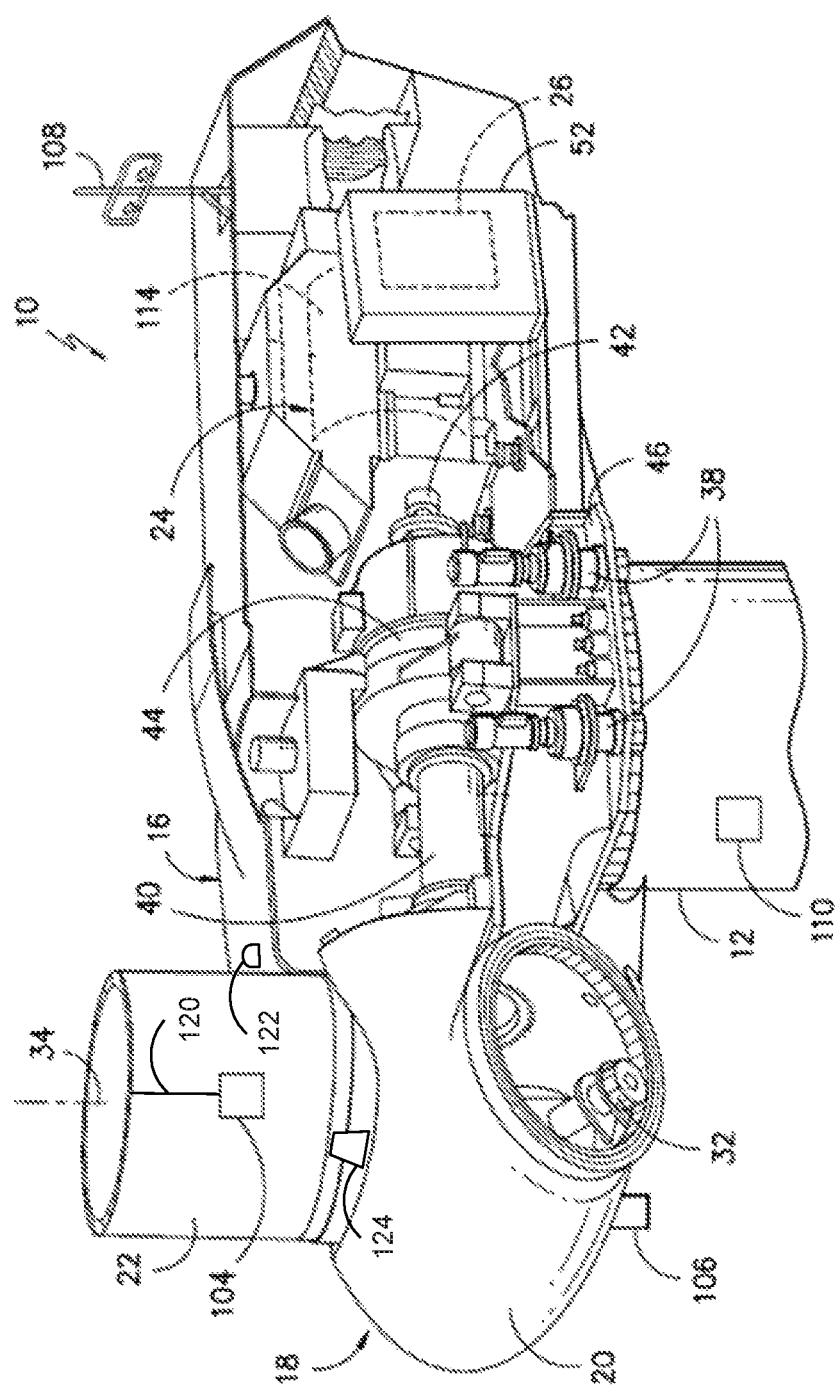
FIG. 2 illustrates a perspective, internal view of a nacelle of a wind turbine according to one embodiment of the present disclosure.

Referring now to FIG. 2, a simplified, internal view of an embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks mounted to the bedplate 46.

Additionally, as indicated above, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20. The present disclosure is further directed to methods for controlling the wind turbine in a manner that compensates for torsionally induced twist in the blades 22, as explained in greater detail below. The controller 26 may be utilized to perform such methods, and may control pitch adjustment of the rotor blades 22 based on such methods in order to compensate for blade twist so that power output of the wind turbine 10 is not unnecessarily limited by a maximum thrust value that does not reflect blade twist. Methods utilized according to the present disclosure advantageously detect if twist is being induced in the blades 22 and, if so, adjust (increase or decrease) the maximum threshold thrust value in the control algorithm to compensate for the induced blade twist by changing pitch angle of the blades 22. In so doing, the wind turbine 10 can operate at rated power output and is not limited by an artificially reduced max thrust value that does not reflect actual blade thrust on the blades 22 twisted in the feather direction. For blades 22 twisted in the power direction, the max thrust value can be decreased to prevent or limit the blades exceeding their design thrust load.

Figure 3A:
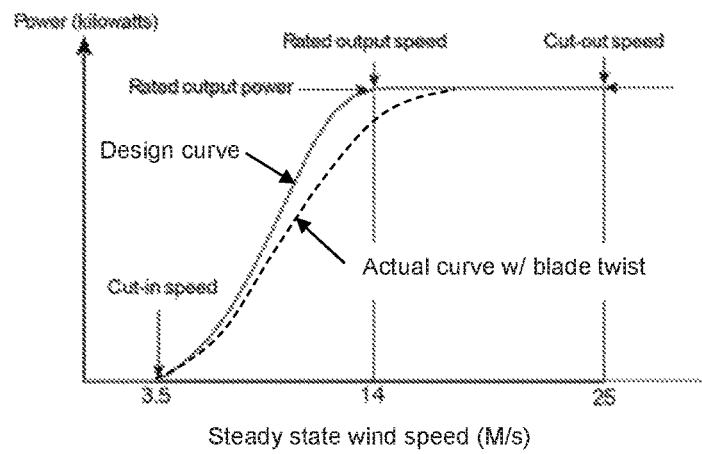
FIGS. 3A through 3C are power, thrust, and pitch angle diagrams, respectively, relative to wind speed illustrating certain operational concepts of the present disclosure.
Figure 3B:
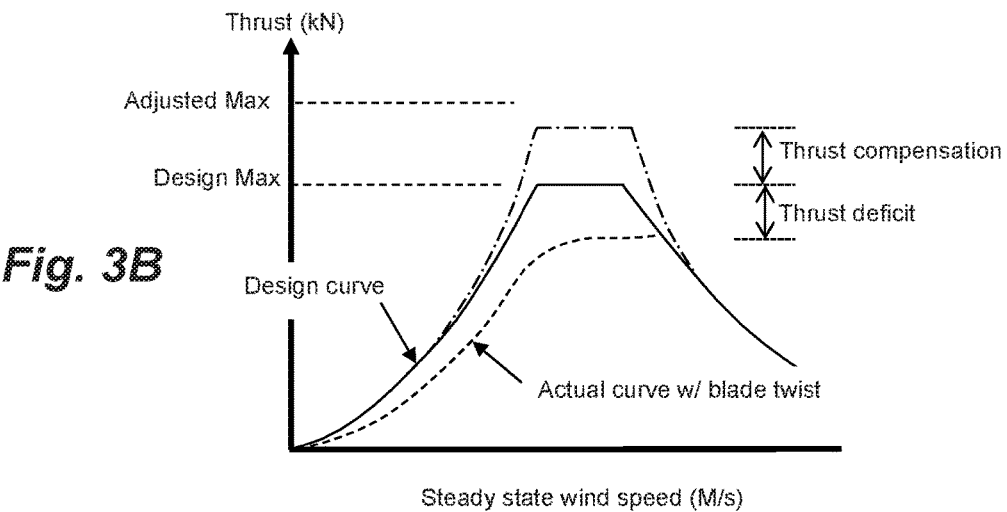
Figure 3C:
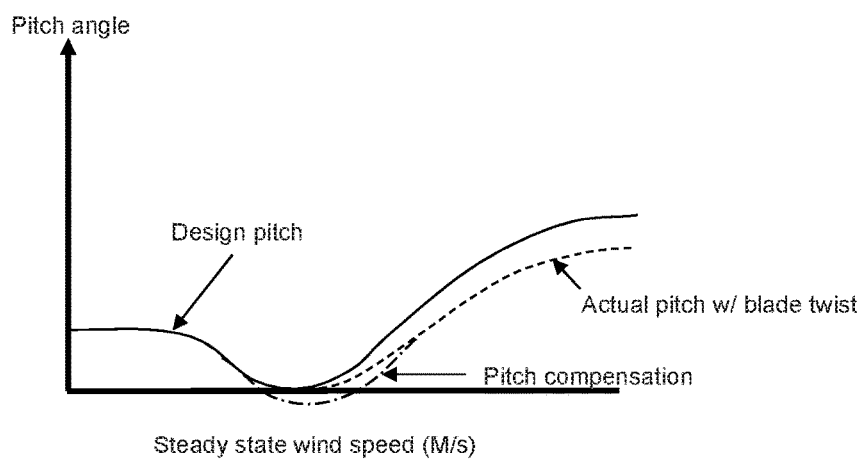

The diagrams of FIGS. 3A through 3C illustrate certain operational concepts of the present method. FIG. 3A depicts an exemplary design power curve (solid line) for a wind turbine wherein the system achieves rated output power at a rated wind speed. As wind speed increases, the controller pitches the blades to maintain the rated output power until wind speed increases to cut-out speed, as is well-known to those skilled in the art. Pitch control of the blades over the course of the design power curve is depicted by the pitch control curve in FIG. 3C (solid line).

The design power curve is developed with a design maximum thrust value as a limiting variable, wherein at rated output power, the thrust load on the turbine blades (and other components) does not exceed this max value, as indicated by the solid line thrust curve in FIG. 3B.

However, as the wind speed increases over the course of the design power curve (FIG. 3A), the blades in actuality may twist (relative to a longitudinal axis of the blade) due to torsionally induced loads on the blades. This phenomenon is more likely with larger blades as the size and power output of wind turbines grow. In certain instances, this torsion-induced twist results in an artificial (and unintended) feathering of the blades that results in the blades dumping wind. As a result, the system does not achieve rated power at rated wind speed, as indicated by the dashed line curve in FIG. 3A. At the same time, the thrust load on the blades is also reduced, as indicted by the dashed curve in FIG. 3B labeled "Actual curve w/blade twist." In other words, at rated wind speed, the blades are not actually subjected to the limiting programmed maximum thrust values and are unnecessarily pitched. A "thrust deficit" (FIG. 3B) exists between actual thrust load and design thrust load when the blades experience torsionally-induced thrust. If the blades were torsionally twisted to the power direction, a "thrust excess" would exist between actual thrust load and design thrust load.

Referring to FIG. 3B, the present methodology recognizes that conventional wind turbine control methods do account for the thrust deficit (blades twisted to the feather position) identified in the figure and, thus, artificially limit the power output of the wind turbine at rated wind speed, as depicted in FIG. 3A. The present methodology detects when the blades experience twist and compensates for such twist by introducing a "thrust compensation" adjustment to the design thrust curve of FIG. 3B. In essence, depending on the direction of blade twist, this adjustment increases or decreases the design max thrust value in the control program. In response, for the feather-direction blade twist, the pitch control curve (FIG. 3C) is not constrained by the "thrust deficit" and is adjusted to new max thrust value (which includes the "thrust compensation" value). In turn, pitch is achieved that allows the actual power curve of FIG. 3A (dashed line) to more closely approximate the design power curve.

Figure 4:
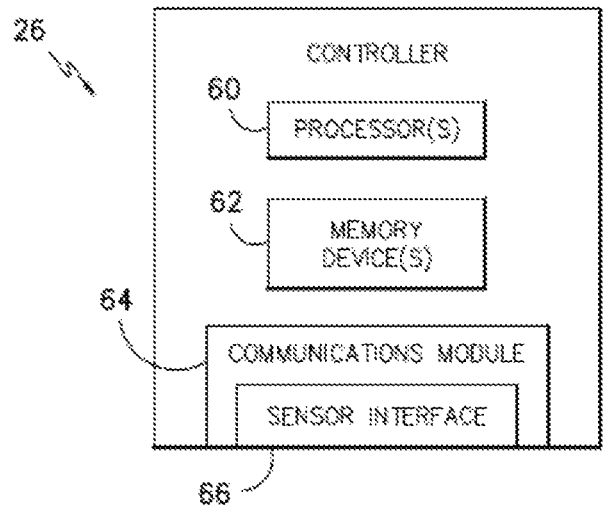
FIG. 4 is a schematic diagram of a controller configuration according to one embodiment of the present disclosure.

Referring to FIG. 4, there is illustrated a block diagram of one embodiment of suitable components that may be included within the turbine controller 26 operating in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various twist sensors, to be converted into signals that can be understood and processed by the processors 60.

Figure 5:
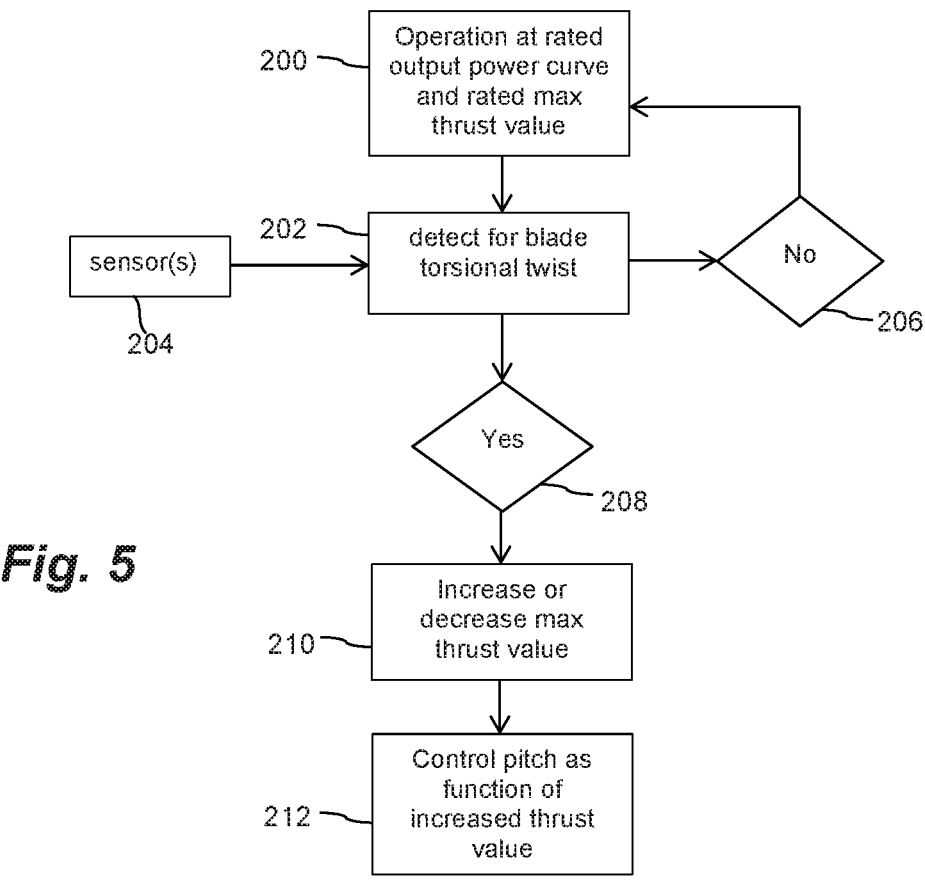
FIG. 5 is a block diagram illustrating a method for controlling a wind turbine to compensate for blade twist according to an embodiment of the present disclosure.

FIG. 5 is a diagram of a method embodiment in accordance with aspects of the invention. It should be understood that methods according to the present disclosure may, in exemplary embodiments, be closed loop feedback methods, and may be utilized for the rotor blades 22 of the wind turbine 10 individually or collectively. For example, desired pitch values, current pitch values, and total pitch values may be input and determined individually for each rotor blade 22 or collectively for the plurality of rotor blades 22.

Methods according to these embodiments may include, for example, determination of the current or actual thrust value 102 for the wind turbine 10, as can be appreciated from FIGS. 3A through 3C. Various methods and apparatus may be utilized for determining a current thrust value 102. In some embodiments, the current thrust value may be measured. For example, sensors 104, such as strain gauges or fiber optic sensors, may be placed on the wind turbine 10, such as on the rotor blades 22 or shaft 40, to directly or indirectly measure the thrust to which the rotor blades 22 are subjected, for example by correlating blade deflection to thrust. Alternatively, measuring devices 106, such as pendulums or accelerometers, may be utilized to measure a tilt angle of the wind turbine 10. The tilt angle may be correlated to the thrust to which the rotor blades 22 are subjected. In other alternative embodiments, the wind speed upwind of the wind turbine 10 may be measured, such as through use of a suitable weather sensor 108. Suitable weather sensors include, for example, Light Detection and Ranging ("LI-DAR") devices, Sonic Detection and Ranging ("SODAR") devices, anemometers, wind vanes, barometers, and radar devices (such as Doppler radar devices). The upwind wind speed may be correlated to the thrust to which the rotor blades 22 are subjected. For example, in some embodiments, the wind speed, and changes therein, can be estimated through use of, for example, a wind observer algorithm, which may be included in the controller 26. The wind observer system may input load torque applied to the generator 24, measured by suitable sensors such as sensors on the generator rotor 114 or input shaft, and driving torque applied by the wind, measured by suitable sensors, and may estimate the wind speed based on these inputs. The estimated wind speed can then be utilized to calculate a corresponding estimated thrust. Alternatively, any suitable methods or apparatus may be utilized to estimate the current or actual thrust value.

As depicted in FIG. 3B, certain embodiments may include, for example, the step of calculating a thrust deficit or excess value and a corresponding thrust compensation value. This calculation may be based on the current thrust value and a predetermined maximum thrust value, which is generally understood to be a thrust level programmed into the controller 26 that the wind turbine 10 should not exceed.

Referring again to FIG. 5, at step 200, the wind turbine is operating at the design rated output power curve, which is determined as a function of the design maximum thrust value, as discussed above.

At step 202, detection of torsion-induced twist in the blades is carried out on a continuous or period basis via input from one or more sensors 204. Various methods and devices may be used for this purpose. For example, the induced torsional twist may be directly detected by sensing a change in a physical aspect of the rotor blades 22 resulting from the induced torsional twist. For example, the induced torsional twist may be directly detected by a sensor 104 mounted on the rotor blades, such as a strain gauge, a fiber optic sensor 120 that runs span-wise along the blade, a gyroscopic sensor or accelerometer, a micro inertial measurement unit (MIMU), and so forth. These sensors may be the same sensors discussed above used to correlate blade deflection to thrust.

In another embodiment, the induced torsional twist may be directly optically detected by a camera 122 disposed to view a span-wise aspect of the rotor blade. For example, the cameral 122 may be located on the nacelle 16 housing to optically capture each blade 22 as it passes the camera's position.

In still another embodiment, the induced torsional twist may be directly detected by a laser 124 (FIG. 2) disposed to detect rotor blade distortion.

In certain embodiments, the induced torsional twist be indirectly detected by an actual measured blade load being less or greater than an expected value at a given wind speed, wherein blade load is calculated based on measured blade deflection or other methods. Similarly, the twist may be inferred from a measured rotor thrust being less or greater than an expected value at a defined wind speed, for example the wind speed at the knee of the power output curve.

In still other embodiments, the induced torsional twist may be indirectly detected by a measured tower bending or deflection (detected by sensor 110) being less or greater than an expected value at a defined wind speed, for example the wind speed at the knee of the power output curve.

An embodiment may include inferring the induced torsional twist from a measured noise at a defined wind speed being higher or lower than an expected value.

In yet another embodiment, the induced torsional twist may be indirectly detected by a difference at rated wind speed between a measured blade pitch angle and an expected blade pitch angle.

The induced torsional twist may be indirectly detected by a difference between a Model Based Controller (MBC) estimated wind speed and an actual measured wind speed.

Referring again to FIG. 5, at step 206 it is determined that the blades 22 are not being twisted, and the control program continues to operate the wind turbine at the rated power output curve.

At step 208, it is determined that the blades are experiencing a torsionally-induced twist (towards the feather position in this embodiment). Upon this determination, the process proceeds to step 210 wherein a thrust compensation value (FIG. 3B) is introduced to increase the max threshold thrust value in the control program to compensate for the thrust deficit. Pitch control is then maintained at the increased thrust value at step 212 so that power output of the wind turbine is not unnecessarily limited by the induced twist on the rotor blades, as discussed above with respect to FIGS. 3A through 3C.

In a certain embodiment, the maximum threshold thrust value is increased or decreased proportionally with the amount of torsional twist induced in the rotor blades. The controller computes a correlation between degree of blade twist and magnitude of the thrust compensation value. In an alternate embodiment, the maximum threshold thrust value is increased or decreased by a predefined amount upon the determination of torsional twist in the rotor blades, wherein this set amount is maintained up to cutout wind speed of the rated power output curve.

The present methodology also incorporates embodiments wherein detection of torsionally-induced twist on the rotor blades leads to a differential determination between programmed maximum threshold thrust and actual thrust, wherein the thrust compensation value is determined as a function of the differential value. Methods are described above for measuring actual thrust at various locations on the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operation of a wind turbine having rotor blades attached to a hub, wherein a controller compensates for torsionally induced blade twist, the method comprising:
   operating the wind turbine according to a rated power output curve and programmed maximum thrust value;
   periodically or continuously detecting for induced torsional twist in the rotor blades;
   upon determination of torsional twist being induced in the rotor blades, adjusting the programmed maximum thrust value to compensate for the torsional twist; and
   the controller controlling pitch of the rotor blades as a function of the adjusted programmed maximum thrust value so that power output of the wind turbine is not limited or increased by the induced twist on the rotor blades.

2. The method as in claim 1, wherein the programmed maximum thrust value is adjusted proportionally with the amount of torsional twist induced in the rotor blades.

3. The method as in claim 1, wherein the programmed maximum thrust value is adjusted by a predefined amount upon the determination of torsional twist in the rotor blades up to cutout wind speed of the rated power output curve.

4. The method as in claim 1, wherein the induced torsional twist is directly detected by sensing a change in a physical aspect of the rotor blades resulting from the induced torsional twist.

5. The method as in claim 4, wherein the induced torsional twist is directly detected by a sensor mounted on the rotor blade.

6. The method as in claim 4, wherein the induced torsional twist is directly optically detected by a camera disposed to view a span-wise aspect of the rotor blade.

7. The method as in claim 4, wherein the induced torsional twist is directly detected by a laser disposed to detect rotor blade distortion.

8. The method as in claim 1, wherein the induced torsional twist is indirectly detected.

9. The method as in claim 8, wherein the induced torsional twist is indirectly detected by an actual measured blade load being less than or greater than an expected value at a given wind speed.

10. The method as in claim 8, wherein the induced torsional twist is indirectly detected by a measured rotor thrust being less than or greater than an expected value at a defined wind speed.

11. The method as in claim 8, wherein the induced torsional twist is indirectly detected by a measured tower bending being less than an expected value at a defined wind speed.

12. The method as in claim 8, wherein the induced torsional twist is indirectly detected by a measured noise at a defined wind speed being different than an expected value.

13. The method as in claim 8, wherein the induced torsional twist is indirectly detected by a difference at a defined wind speed on the power output curve between a measured blade pitch angle and an expected blade pitch angle.

14. The method as in claim 8, wherein the induced torsional twist is indirectly detected by a difference between a Model Based Controller (MBC) estimated wind speed and an actual measured wind speed.

* * * * *